(12) United States Patent
Singh et al.

(10) Patent No.: US 11,119,971 B1
(45) Date of Patent: Sep. 14, 2021

(54) I2C STANDARD COMPLIANT BIDIRECTIONAL BUFFER

(71) Applicant: Texas Instruments Incorporated, Dallas, TX (US)

(72) Inventors: Tarunvir Singh, Punjab (IN); Anant Shankar Kamath, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/071,902

(22) Filed: Oct. 15, 2020

(51) Int. Cl.
  *G06F 13/00* (2006.01)
  *G06F 13/42* (2006.01)
  *G06F 13/40* (2006.01)

(52) U.S. Cl.
  CPC ...... *G06F 13/4282* (2013.01); *G06F 13/4068* (2013.01); *G06F 2213/0002* (2013.01); *G06F 2213/0016* (2013.01)

(58) Field of Classification Search
  CPC .................................................. G06F 13/4282
  See application file for complete search history.

(56) References Cited

U.S. PATENT DOCUMENTS

| | | | |
|---|---|---|---|
| 6,111,437 A * | 8/2000 | Patel | H03K 5/2481 327/407 |
| 7,793,022 B2 | 9/2010 | Travers et al. | |
| 8,335,249 B1 | 12/2012 | Su et al. | |
| 8,750,351 B2 | 6/2014 | Muth | |
| 8,868,807 B2 | 10/2014 | Kashima | |
| 9,130,797 B1 * | 9/2015 | Palusa | H04L 25/03878 |
| 9,959,223 B2 | 5/2018 | Du et al. | |
| 9,990,316 B2 | 6/2018 | Mishra et al. | |
| 2007/0240019 A1 | 10/2007 | Brady et al. | |

* cited by examiner

*Primary Examiner* — Henry Tsai
*Assistant Examiner* — Dean Phan
(74) *Attorney, Agent, or Firm* — John R. Pessetto; Charles A. Brill; Frank D. Cimino

(57) ABSTRACT

Disclosed embodiments include a serial buffer device comprising first and second serial input/output (I/O) ports, first and second comparators, and a multiplexer having a first input coupled to the output of the first comparator and a second input coupled to the output of the second comparator. There is also a transistor, a third comparator having first and second inputs and an output, wherein the first input is coupled to the second serial I/O port, the second input is coupled to a third reference voltage source, and the output is coupled to the control terminal of the multiplexer. Additionally, the embodiment includes an impedance controlled driver circuit having an input and an output, wherein the input is coupled to the output of the third comparator and the output is coupled to the first serial I/O port.

20 Claims, 4 Drawing Sheets

I2C STANDARD COMPLIANT BIDIRECTIONAL BUFFER

BACKGROUND

Inter-integrated circuit (I2C) is a synchronous multi-master, multi-slave, packet-switched, single-ended, two-wire serial communication bus. The I2C bus is widely used to connect peripheral devices to microcontrollers and microprocessors for short distance intra-board communication. I2C uses two open-collector or open-drain lines, a serial data line (SDA) and a serial clock line (SCL). The SCL and SDA lines are pulled up by resistors to a power supply. A device pulls the I2C bus line low (provides a short to ground) or releases the bus line (high impedance to ground) and allow the pull-up resistor to raise the voltage to a logic high.

When a slave device or a master device transmits a logic high, it releases the bus by turning off the pull-down FET. This leaves the bus floating, and the pull-up resistor will pull the voltage up to the supply voltage rail, which will be interpreted as a logic high.

The I2C bus is driven by master devices and slave devices. A master device generates the serial clock and initiates communication with slave devices. A slave device receives the serial clock and responds when addressed by the master device. Master devices and slave devices both send and receive communications on the I2C bus.

The I2C bus is a multi-master bus, meaning that any number of master devices can be present. Furthermore, the master and slave modes of devices can be changed between data messages.

There can be four potential modes of operation for any given device on the bus. A first mode is master transmit mode in which the master device is sending data to a slave device. A second mode is master receive mode in which the master device is receiving data from a slave device. A third mode is slave transmit mode in which a slave device is sending data to the master. A fourth mode is slave receive mode in which a slave device is receiving data from the master.

When a device that has been transmitting data completes sending the data, the device releases the I2C bus, thus leaving the I2C bus undriven. When the I2C bus is undriven, in the absence of anything to pull the bus low, the I2C bus floats to logic high due to pullup resistors being connected to the serial bus line as required by the I2C specification.

The I2C protocol provides for bidirectional communication on the SDA and SCL signal lines. When buffers are used on the SDA and SCL lines, the bidirectional nature of the bus can contribute to a latch condition at logic low, which is the dominant state, unless additional circuitry is added to mitigate that possibility. Solutions have been devised that decrease the likelihood of a latch occurring on the I2C bus, but many of those solutions can cause the device to no longer be I2C standard-compliant. There is a need for an I2C buffer that reduces the risk of bus latching while maintaining I2C compliance.

SUMMARY

A first disclosed embodiment includes a serial buffer device comprising first and second serial input/output (I/O) ports, a first comparator having first and second inputs and an output wherein the first input is coupled to the first serial I/O port, and the second input is coupled to a first reference voltage source, a second comparator having first and second inputs and an output, wherein the first input is coupled to the first serial I/O port, and the second input is coupled to a second reference voltage source.

The first disclosed embodiment also includes a multiplexer having first and second inputs, a control terminal, and an output, wherein the first input is coupled to the output of the first comparator, and the second input is coupled to the output of the second comparator. Further, there is a transistor having a control terminal and first and second current terminals, wherein the control terminal is coupled to the output of the multiplexer and the first current terminal is coupled to the second serial I/O port.

Additionally, the first embodiment includes a third comparator having first and second inputs and an output, wherein the first input is coupled to the second serial I/O port, the second input is coupled to a third reference voltage source, and the output is coupled to the control terminal of the multiplexer, and an impedance controlled driver circuit having an input and an output, wherein the input is coupled to the output of the third comparator and the output is coupled to the first serial I/O port.

A second disclosed embodiment includes a method for reducing serial bus latch-ups comprising receiving, at a first serial I/O port, a logic signal from a first device coupled to a second I/O port, comparing the logic signal to a first reference voltage, and providing a first output. The embodiment further includes transmitting the first output to an input of an impedance controlled driver circuit whose output is connected to the first I/O port, driving an output of the impedance controlled driver low in response to a low at the input of the impedance controlled driver, or else allowing the output of the impedance controlled driver to float high in response to a high at the input of the impedance controlled driver, first regulating the output of the impedance controlled driver to a selected voltage responsive to the first output transitioning from a high to a low, then increasing the voltage at the output of the impedance controlled driver circuit after a certain blanking time, and the voltage at the output of the impedance controlled driver circuit is measured and compared to a second reference voltage.

The second embodiment further includes determining whether the first I/O port connected to the serial bus is being driven low by a second device that is coupled to the serial port and enabling the transistor coupled to the second I/O port to turn on only if the first I/O port is being driven low by the second device.

Like reference symbols in the various drawings indicate like elements. Details of one or more implementations of the present disclosure are set forth in the accompanying drawings and the description below. The figures are not drawn to scale and they are provided merely to illustrate the disclosure. Specific details, relationships, and methods are set forth to provide an understanding of the disclosure. Other features and advantages may be apparent from the description and drawings, and from the claims.

DETAILED DESCRIPTION

The I2C standard establishes bidirectional communication on the SDA and SCL lines. The I2C standard requires that the maximum output voltage for a logic low be 400 mV, and that the minimum input voltage level recognized as a logic low be $0.3*V_{CC}$ where $V_{CC}$ is the supply voltage. So, in the case where $V_{CC}$ is 3V and all devices on the bus are I2C compliant, a transmitting device will output a voltage between ground and 400 mV for a logic low, whereas a receiving device will recognize any voltage between ground and 900 mV as a logic low. Therefore, there should be margin for noise while still maintaining reliable communication between a device transmitting a low and a receiving device recognizing that transmission as a low on the I2C bus. However, if a bidirectional buffer device is placed in the communication path between two devices communicating with each other on an I2C bus, a latch condition at logic low can occur in some cases.

Figure 1:
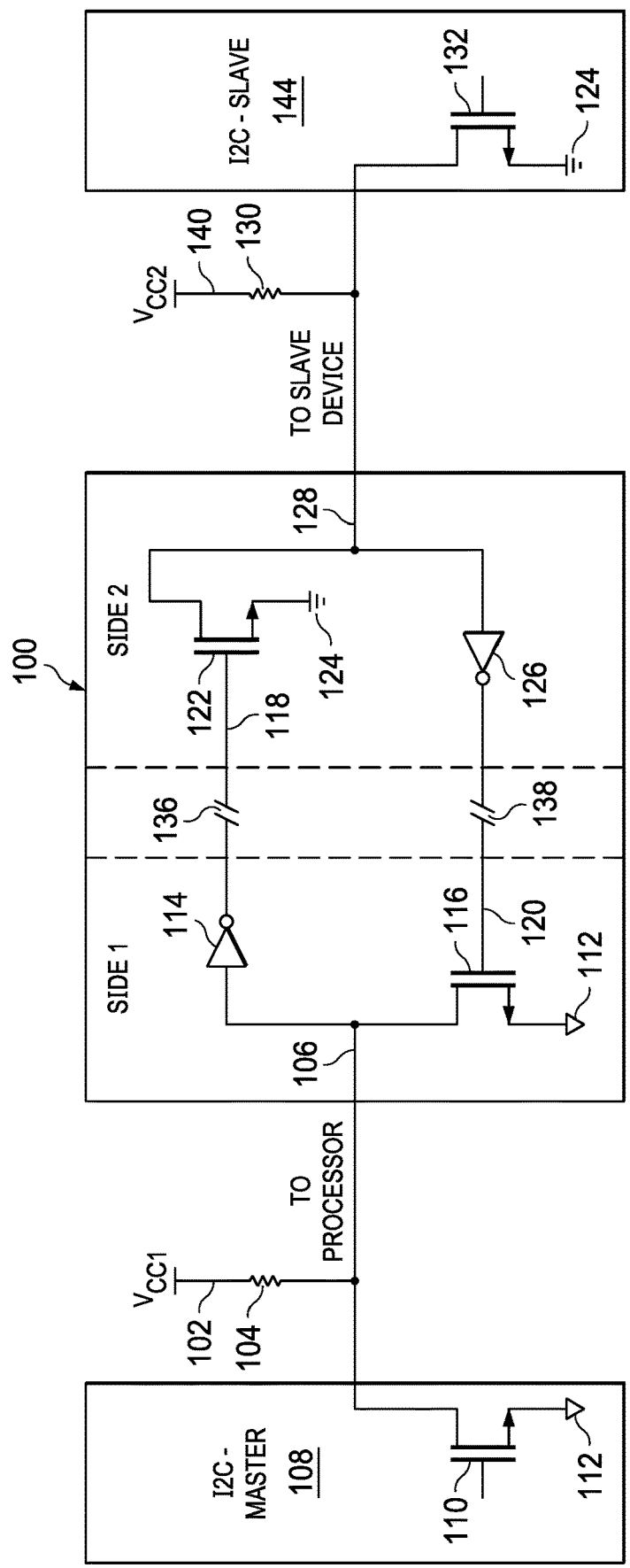
FIG. 1 shows a typical I2C bidirectional isolated buffer device.

FIG. 1 shows a typical I2C bidirectional isolated buffer device 100. Side 1 of buffer device 100 has input/output terminal 106 and consists of inverter 114 and transistor 116. The input/output terminal 106 can be connected to a processor 108 or possibly some other device on the I2C bus that serves as the I2C master device.

Side 2 of buffer device 100 has input/output terminal 128 and consists of inverter 126 and transistor 122. The input/output terminal 128 can be connected to an I2C slave device 144. Terminals 106 and 128 of buffer device 100 may be connected to a serial clock line or a serial data line. Side 1 of buffer device 100 has ground reference 112, which is connected to the ground reference terminal of the processor 108. Side 2 of buffer device 100 has ground reference 124, which is connected to the ground reference of slave device 144.

Side 1 and processor 108 are powered by $V_{CC1}$ 102, while side 2 and slave device 144 are powered by $V_{CC2}$ 140. $V_{CC1}$ and $V_{CC2}$ may be at the same voltage, or may be at different voltages. Isolators 136 and 138 provide DC isolation between side 1 and side 2 while allowing AC signals to pass. Having this isolation can be useful, particularly if $V_{CC1}$ and $V_{CC2}$ are at different voltage levels or is there is a DC offset between ground 112 and ground 124. There are numerous possible methods for providing this isolation, such as the use of a transformer, capacitors, or an optocoupler pair.

Isolators 136 and 138 reduce the DC offset in the signals between processor 108 and slave device 144 while allowing bidirectional communication of AC signals between side 1 and side 2, such as a serial clock line or a serial data line. Having DC isolation between side 1 and side 2 allows $V_{CC1}$ 102 and $V_{CC2}$ 140 to be at different voltages. In this manner, buffer device 100 can act as a voltage level translator between the processor 108 and slave device 144 if they are powered at different voltages.

The I2C input to buffer 100 from processor 108 is at input/output terminal 106. External to the buffer 100 is a pull-up resistor 104 having one lead coupled to input terminal 106 and the other lead coupled to $V_{CC1}$ 102. The input stage of the I2C interface for processor 108 is represented by transistor 110, having a source terminal referenced to ground 112. The drain of transistor 110 is connected to input/output terminal 106 and to pull-up resistor 104, which is connected to $V_{CC1}$ 102.

The I2C input to buffer 100 from slave device 144 is at input/output terminal 128. External to buffer 100 is a pullup resistor 130 having one lead coupled to input terminal 128 and the other lead coupled to $V_{CC2}$ 140. The input stage of the I2C bus interface for slave device 144 is represented by transistor 132, having a source terminal coupled to ground 124. The drain of transistor 132 is connected to input/output terminal 128 and to pull-up resistor 130, which is connected to $V_{CC2}$ 140.

The I2C serial clock or serial data input from processor 108 comes through input/output port 106 to the input of inverter 114. A first terminal of isolator 136 is coupled to the output of inverter 114. A second terminal of isolator 136 is coupled to the gate terminal of transistor 122, which has its source terminal coupled to ground 124. The drain terminal of transistor 122 is coupled to input/output terminal 128, which is coupled to the I2C bus interface of slave device 144.

The input/output terminal 128 is also coupled to the input of inverter 126. A first terminal of an isolator 138 is coupled to the output of inverter 126. A second terminal of isolator 138 is coupled to the gate terminal of transistor 116, which has its source terminal coupled to ground 112. The drain terminal of transistor 116 is coupled to input/output terminal 106, which is coupled to the I2C bus interface of processor 108.

If the I2C bus is not being driven low, the input to inverter 114 is pulled up by resistor 104 to the voltage of $V_{CC1}$ 102, and the input to inverter 126 is pulled up by resistor 130 to $V_{CC2}$ 140. For side 1 or side 2 to output a logic low, the corresponding transistor, 116 for side 1 or 122 for side 2, is turned on. Turning on either transistor 116 or 122 effectively shorts the output of that transistor to ground. For side 1 or side 2 to output a logic high, the corresponding transistor 116 or 122 is turned off. A logic low is the dominant state on an I2C bus because the bus must be driven low in order to achieve a low, while a logic high occurs when the bus is not being driven.

When processor 108 outputs a low, the I2C bus is pulled low. When the I2C bus is pulled low, the input to inverter 114 becomes low, and the output 118 of inverter 114 goes high. When the output 118 of inverter 114 goes high, transistor 122 is turned on pulling its output and input/output terminal 128 low. When input/output terminal 128 goes low, the input to inverter 126 goes low, thus making the output 120 of inverter 126 high. With the output of inverter 126 high, transistor 116 is turned on, keeping its output 106 low, thus keeping the signal at input/output 106 low.

The voltage at input/output 106 is set by $V_{CC1}$ 102 and the voltage divider created by pullup resistor 104 and the resistance of transistor 116. When transistor 116 is on, the on-resistance of transistor 116 is low compared to the resistance of pull-up resistor 104, thus making the voltage at input/output 106 close to the voltage at ground 112. The voltage at input/output 106 will remain close to the voltage at ground 112 as long as transistor 116 is turned on.

If processor 108 wants to pull the bus from low to high, it will not be able to as long as transistor 116 is turned on, because transistor 116 will hold input/output terminal 106 at logic low, and processor 108 will not be able to pull the I2C bus high. When this sequence occurs, a latch condition can be created with the I2C bus stuck at logic low preventing the bus from being pulled high. There is a need for a solution to reduce the possibility of an I2C bus latchup at logic low.

The voltage at input/output terminal 106 will change depending upon whether transistor 110 of processor 108 is turned on or off because the on-resistance of transistor 116 will be in parallel with the on-resistance of transistor 110. Therefore, the voltage at input/output node 106 is equal to $V_{CC1}*(R_{110}/R_{116}) (R_{104}+(R_{110}/R_{116}))$.

If processor 108 is not driving the bus low, then transistor 110 is turned off and has high impedance. When transistor 110 is off and transistor 116 is turned on, the parallel resistance of transistors 110 and 116 ($R_{110}//R_{116}$) will be approximately equal to the on-resistance of transistor 116. If transistors 110 and 116 are turned on, the parallel resistance of transistors 110 and 116 ($R_{110}//R_{116}$) will be approximately equal to half of the on-resistance of transistor 116, assuming the on-resistances of transistors 110 and 116 are similar. Therefore, with transistor 116 turned on, the voltage at input/output terminal 106 will be different depending upon whether processor 108 is controlling transistor 110 to be turned on or to be turned off.

Figure 2:
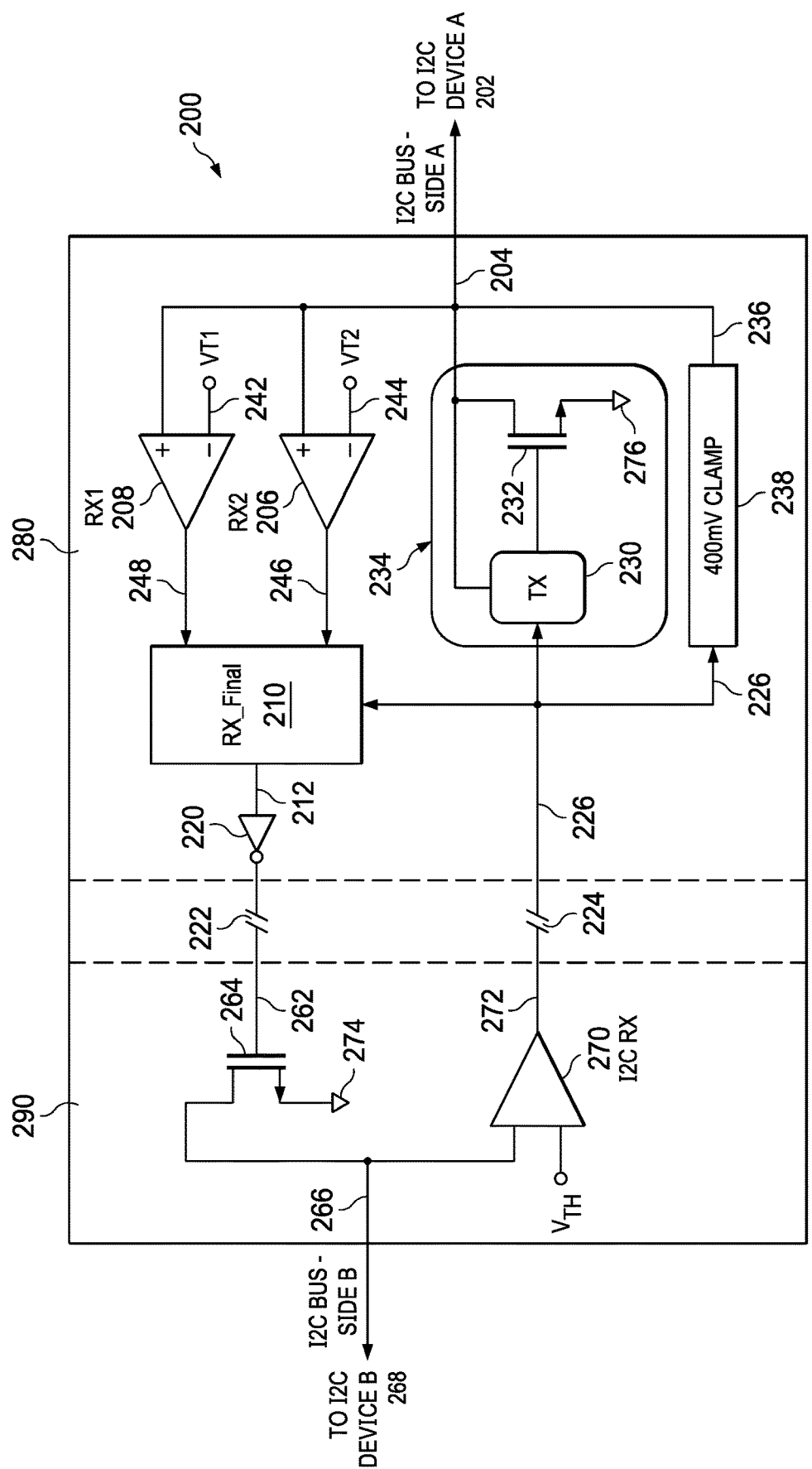
FIG. 2 shows an example I2C bidirectional isolated buffer circuit to reduce the possibility for a latch-up at logic low on the I2C bus while maintaining I2C compliance.

FIG. 2 shows a circuit that can be implemented on either the slave interface side or the master interface side of a buffer device to reduce the possibility for a latch-up at logic low on the I2C bus. The circuit of FIG. 2 can be implemented on either side of an isolated buffer device or a non-isolated buffer device. The circuit modulates the impedance of a drive transistor to regulate the voltage on the bus during the I2C blanking period for the purpose of determining whether a low signal on the I2C bus is due to another device driving the I2C bus low or if the low signal is solely due to the drive circuit of the buffer device.

The circuit includes an impedance controlled driver 234 in the transmit path that increases its impedance following an initial output stabilization to a specified voltage (e.g. 150 mV) in response to a transition from high to low at its input. This increase in impedance occurs on each high to low transition at its input. The effect of the change in impedance on the bus voltage is observed to determine whether the bus is being driven low by a device on the bus, or if the logic low is due to the buffer device's own driver. If it is determined that another device on the bus is driving the bus low, the circuit will release the bus and break the potential latch condition.

FIG. 2 shows an example I2C bidirectional isolated buffer device 200 having side A 280 and side B 290. Side A 280 may be coupled to the I2C port of an I2C device, Device A 202. Side B 290 may be coupled to the I2C port of an I2C device, Device B 268. Device A could be either a master device or a slave device, and Device B could also be either a master device or a slave device.

A bidirectional serial data or serial clock signal from Device A 202 is transmitted via the I2C bus and received on side A 280 at input/output terminal 204. The first input terminals of comparators 206 and 208 are each coupled to side A input/output terminal 204 and each receives the signal from Device A 202. A second input terminal of comparator 208 is coupled to a reference supply voltage VT1 242. In at least one example, VT1 242 has a voltage of $0.3*V_{CC}$ where $V_{CC}$ is the supply voltage for comparator 208. The value of $0.3*V_{CC}$ is chosen to enable compliance with the I2C standard, because the specification for the maximum allowed value for a received logic low signal according to the I2C spec is $0.3*V_{CC}$. The output 248 of comparator 208 is a comparison between the signal coming in from the side A input/output terminal 204 and reference supply voltage VT1 242.

A second input terminal of comparator 206 is coupled to a reference supply voltage VT2 244 having a voltage that is derived from design choices to ensure that a transmitted logic low does not exceed 400 mV. In at least one example, the reference voltage VT2 244 is chosen to be 275 mV to provide design margin. This voltage at VT2 leads to the design choice of 150 mV as being the voltage that the bus initially settles to after a transition from high to low. The voltage on side B of the bus is the voltage at node 266, which is the result of a voltage divider of $V_{CC1}$ between the resistance of a pull-up resistor (not shown) on side B 290 of the bus and the resistance of transistor 264. The output 246 of comparator 206 is a comparison between the signal coming from input/output terminal 204 and reference supply voltage VT2 244.

The output 246 of comparator 206 and the output 248 of comparator 208 are first and second inputs, respectively, to multiplexer RX_Final 210. In at least one example, the multiplexer RX_Final 210 may be implemented as a combination logic block. A control input for RX_Final 210 is output signal 226 of isolator 224 which brings a signal from side B 290 to side A 280. The signal from output 226 informs side A 280 of the status of the I2C bus on side B 290. Signal 226 also controls whether the output 212 of multiplexer RX_Final 210 comes from output 246 of comparator 206 or from output 248 of comparator 208. The output 212 of RX_Final 210 is coupled to a first terminal of isolator 222 to be transmitted from side A 280 to side B 290 of the isolated buffer device 200.

Inverter 220 provides a signal inversion of the output 212 of RX_Final 210 is inverted prior to being transmitted from side 280 to side B 290. In some examples, the inverter may be integrated with the RX_Final circuit so that the output 212 of RX_Final 210 is already inverted. In other examples, the signal is inverted after it passes through isolator 222.

Isolator 222 provides DC isolation between side A 280 and side B 290 while allowing AC signals to pass from side A 280 to side B 290. There are numerous possible methods for providing this isolation, such as the use of a transformer, capacitors, or an optocoupler pair, as well as other methods.

The signal 262 is the output of isolator 222 and is input to the control terminal of transistor 264 on side B 290 of buffer device 200. A first current terminal of transistor 264 is coupled to ground reference 274. The output terminal of transistor 264 is coupled to side B input/output terminal 266. The side B input/output terminal 266 is coupled to the I2C port of Device B 268. The sequence hereinabove is an example of how an I2C communication can be transmitted from Device A 202 to Device B 268 through buffer device 200.

If Device B 268 transmits an I2C communication to Device A 202, Device B 268 sends the I2C communication to the side B input/output port 266. Side B input/output port 266 is coupled to a first input of comparator 270. The second input of comparator 270 is a reference voltage $V_{TH}$, which in one example has a voltage between $0.3*V_{CC}$ and $0.7*V_{CC}$, where $V_{CC}$ is the voltage of the supply for comparator 270. The output of comparator 270 is coupled to the input of isolator 224 to be transmitted from side B 290 to side A 280 of the isolated buffer device 200. Isolator 224 provides DC isolation between side B and side A while allowing AC signals to pass from side B 290 to side A 280. There are numerous possible methods for providing this isolation, such as the use of a transformer, capacitors, or an optocoupler pair, as well as other methods.

The output of isolator 224 is signal 226, which is input to an impedance controlled driver 234, which is made up of transmitter 230 and transistor 232. A first input terminal of transmitter 230 receives signal 226, and a second input terminal of transmitter 230 receives voltage feedback from the input/output port 204. The output terminal of transmitter 230 is coupled to the control terminal of transistor 232.

Transmitter 230 modulates the on-resistance of transistor 232 by varying the voltage that it provides to the control terminal of transistor 232. By modulating the on-resistance of transistor 232, the voltage at input/output port 204 can be modulated. An increase in the on-resistance of transistor 232 results in an increase in voltage provided to the control terminal of transistor 232.

A non-inverting relationship exists between signal 272 and signal 226, as well as between signal 226 and the output 204 of impedance controlled driver 234. If signal 272 is low, impedance controlled driver 234 drives the output bus state 204 low. If signal 272 is high, impedance controlled driver 234 stops driving the bus, allowing it to float high as long as there is no external drive from Device A 202.

When the output of transmitter 230 is near ground, transistor 232 is turned off, and the drain of transistor 232 will not be driving input/output port 204. In this case, Device A 202 will be able to control the bus and the voltage at input/output port 204. Device A 202 will be able to drive both the bus and the voltage at input/output port 204 low, if that is desired. However, if neither Device A 202 nor impedance controlled driver 234 is driving the bus, the I2C bus will float high due to the bus being pulled up by a resistor (not shown) coupled to a power supply.

Figure 4:
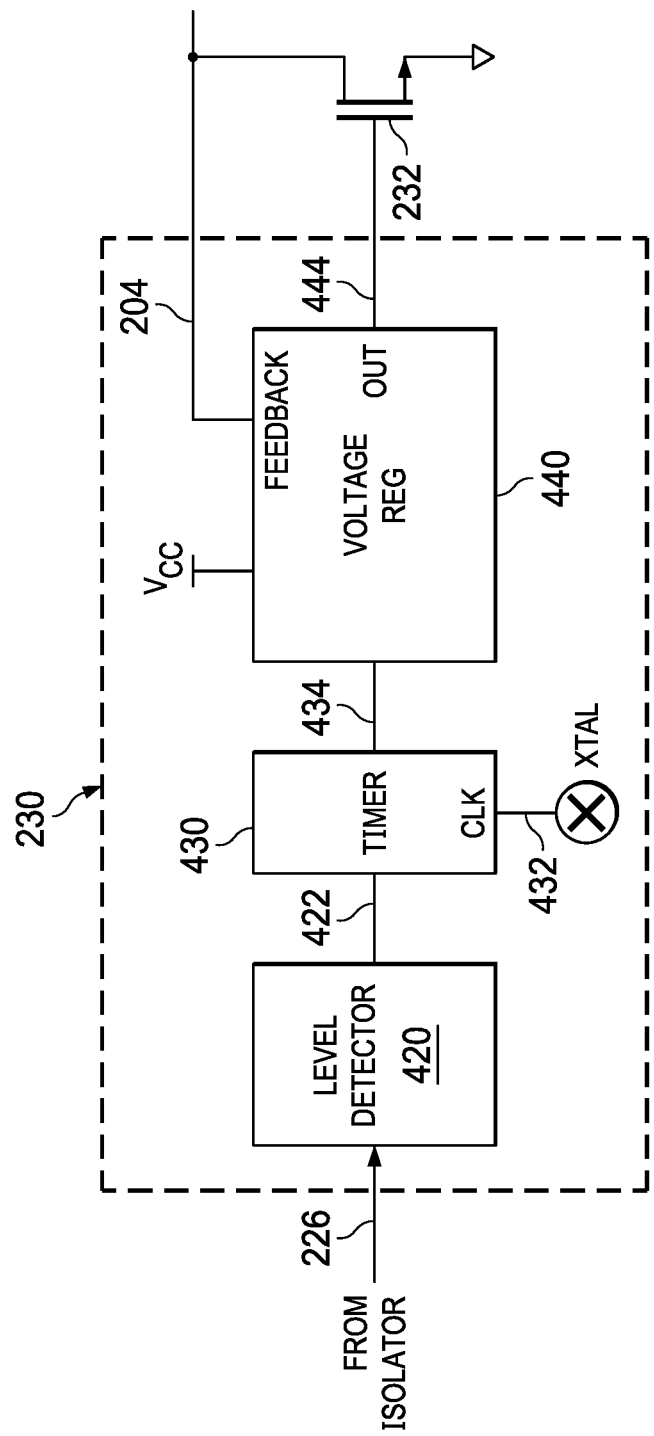
FIG. 4 shows an example implementation of an impedance controlled driver circuit that includes a transmitter and a transistor.

FIG. 4 shows one example implementation of transmitter 230 which is a component of impedance controlled driver 234. Transmitter 230 is comprised of level detector 420, timer 430, and internal voltage regulator 434. Signal 226 is fed to the input terminal of level detector 420. Level detector 420 is monitoring signal 226 for a transition from high to low. In response to signal 226 transitioning from high to low, level detector 420 outputs signal 422, which starts timer 430 counting. The output of timer 430 sends an enable signal 434 to voltage regulator 440. Voltage regulator 440 outputs a gate drive signal 444 to the control terminal of transistor 232. The voltage of the gate drive signal 444 varies to change the on resistance of transistor 232.

Following a specified time period, timer 430 sends a subsequent signal 434 to voltage regulator. In response to the subsequent signal 434, voltage regulator 440 decreases gate drive signal 444 provided to the control terminal of transistor 232, resulting in an increase in the on-resistance of transistor 232. In one example, the on resistance of transistor 232 is doubled in response to the subsequent signal 434. A feedback signal 204 from the output of transistor 232 provides closed loop regulation for voltage regulator 440. In another embodiment of impedance controlled driver 234, transistor 232 is a series of transistors connected in parallel, and the on resistance is increased by turning off a proportionate number of transistors in the series.

Signal 226 is input to the control terminal, or third input terminal, of RX_Final 210. Signal 226 switches the output 212 of RX_Final 210 between input 248 and input 246. Whether the bus is being driven low by Device A 202 can be determined by observing the output 246 of comparator 206 after the on-resistance of transistor 232 is increased. If the output 246 of comparator 206 is low, this implies Device A 202 is driving the line low. If the output 246 of comparator 206 is high after the on-resistance of transistor 232 is increased, then Device A 202 is not driving the line.

Multiplexer RX_Final 210 chooses as its output 212 the output 246 of comparator 206 if signal 226 is low and the impedance controlled driver 234 is driving its output 204 low. Multiplexer RX_Final 210 chooses as its output 212 the output 248 of comparator 208 if signal 226 is high and the output 204 of impedance controlled driver 234 is floating.

Additionally, signal 226 is input to voltage clamp 238, which clamps the I2C bus to 400 mV when the clamp is enabled. Voltage clamp 238 is enabled when its input signal 226 is at logic low. There are numerous possible implementations for the enabling and voltage limiting circuits of voltage clamp 238. One example implementation of an enable circuit for voltage clamp 238 includes a comparator having signal 226 and a stable reference voltage as inputs, and having an output signal that controls a switch that selectively disables the circuit when input signal 226 is at logic high. Example implementations of a circuit for limiting the voltage of output signal 236 when voltage clamp 238 is enabled include using a Zener diode or using an op amp circuit for voltage limiting.

The output 236 of voltage clamp 238 is coupled to the side A input/output port 204. The side A input/output terminal 204 is coupled to the I2C port of Device A 202. The sequence hereinabove is an example of how an I2C communication can be transmitted from Device B 268 to Device A 202 through buffer device 200.

Figure 3:
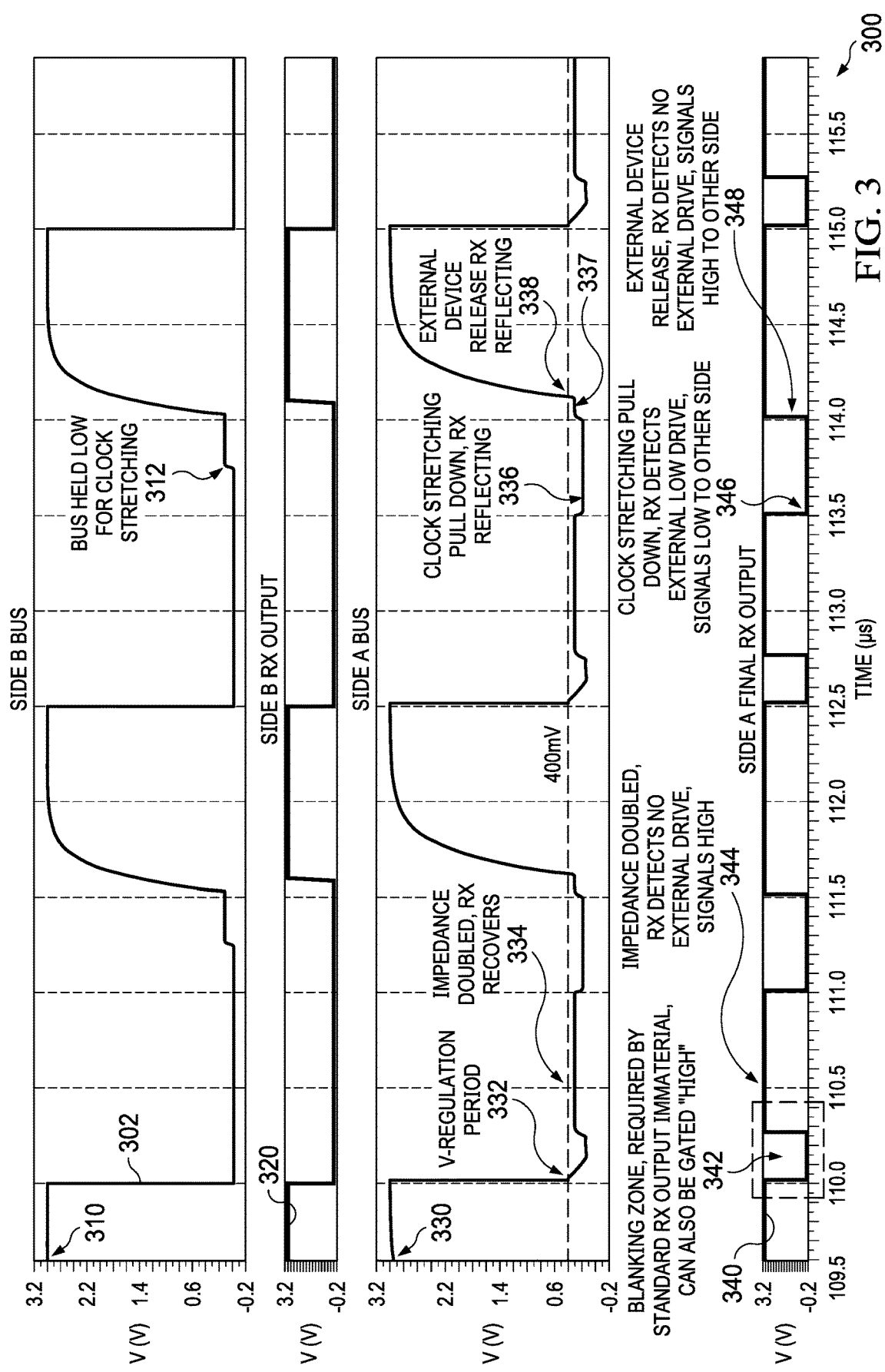
FIG. 3 shows an example timing diagram of signals on each side of the I2C bus and at each of the input/output ports of a bidirectional isolated buffer device.

FIG. 3 shows an example timing diagram 300 of the signals on the bus and at the input/output port of buffer device 200. Graph 310 is the signal present on the I2C bus on side B. Graph 320 is the signal at 272, the output of comparator 270 on side B 290 of buffer device 200. Graph 330 is the signal present on the I2C bus on side A. Graph 340 is the signal at output 212 of RX_Final 210 on side A 280 of buffer device 200. There is an inverting relationship between signal 212 and signal 262 not shown in FIG. 3, wherein signal 212 will be high if signal 262 is low.

At time 302, the I2C bus on side A and side B, as well as input/output ports 266 and 204, all transition from high to low. When a signal on the I2C bus goes low, it must remain low for a minimum period to ensure that data stabilizes before it is considered valid. As an example, for a sample rate of 1 MHz, the minimum time that a low-going pulse must remain low, according to the I2C specification, is 500 microseconds. This time period is known as the blanking zone and is shown as 342 in graph 340. During the blanking zone, the I2C bus is not to be read because it is assumed that signals may be in transition during this time and may not be valid. The RX output is immaterial during this time, so it can also be gated high.

Referring to graph 330, the voltage on side A of the I2C bus drops at time 302 to 400 mV. The voltage clamp 238 becomes active and clamps the bus voltage at 400 mV. This is followed by a voltage regulation period 332 during which time transmitter 230 modulates the voltage that it provides to the control terminal of transistor 236. As the voltage transmitter 230 provides to the control terminal of transistor 236 increases, the on-resistance of transistor 236 decreases, causing the voltage on the I2C bus to decrease. The voltage at the output of transistor 232 is fed back to an input of transmitter 230 creating a voltage regulation feedback loop. The voltage at the output of transistor 232 is regulated down to a setpoint voltage, which in this example is 150 mV. The setpoint voltage is proportional to the voltage chosen for the reference supply voltage VT2 244 that is provided to comparator 206, and this voltage will scale linearly. In one example, choosing a reference supply voltage VT2 of 275 mV leads to a setpoint voltage of 150 mV.

When the voltage at the output of transistor 232 reaches the setpoint voltage, the voltage will remain at that level for the remainder of the blanking period 342. When the blanking period ends, transmitter 230 modulates the voltage it provides to the control terminal of transistor 232 to increase the on-resistance of transistor 232. In one example, the on-resistance of transistor 232 is doubled. When the on-resistance of transistor 232 is doubled, the voltage at the output of transistor 232 goes from 150 mV to 300 mV as shown at 334 on graph 330. Because the voltage at the output of transistor 232 doubled when the on-resistance of transistor 232 doubled, it is known that Device A 202 is not driving the bus low. Instead the low signal at input/output port 204 originated from side B 290. In the case where Device A 202 is driving the bus low, the voltage at the output of transistor 232 will not double when the on-resistance of transistor 232 doubles because there is an additional resistance in parallel with the on-resistance of transistor 232 coming from Device A 202. If Device A 202 is driving the I2C bus low, the voltage at the output of transistor 232 goes from 150 mV to a voltage around 230 mV.

Having determined at 334 on graph 330 that Device B 268 is driving the bus low, input/output port 204 passes this information to Device A 202 by making the side A bus low. If Device A 202 wants to do clock stretching, such as 336 on graph 330, the bus needs to be held low until Device A 202 has completed processing its data and is ready to release the bus.

On side A 280 of device 200, 346 shows the output 212 of RX_Final 210 going low in response to the clock stretching event 336 causing the voltage on the I2C bus to drop to around 230 mV. When the bus voltage drops to around 230 mV, the output 246 of comparator 206 will be at logic high. When the bus is released at 337, the voltage on side A of the bus rises again to around 300 mV, causing the output 212 of RX_Final 210 to go high at 348. The output 212 of RX_Final 210 going high results in transistor 264 being turned off because the control terminal of transistor 264 will be made low. In response to 264 being turned off, the input/output terminal 266 is pulled up high by the external pull up resistor. Eventually, the voltage at input/output terminal 266 rises higher than the threshold voltage $V_{TH}$ of comparator 270.

In response to the voltage at input/output terminal 266 going higher than the threshold voltage $V_{TH}$ of comparator 270, the output 272 of comparator 270 goes high. The output 272 of comparator 270 going high causes transmitter 230 to stop driving the output of transistor 232 low, thus avoiding a potential latchup condition at logic low.

The signal 226, which is the input to transmitter 230, drives the bus low if it is low. The output 212 of RX_Final 210 is equal to the output 246 of comparator 206. If the signal at 226 is high and side A transmitter is not driving the bus, the output 212 of RX_Final 210 is equal to the output 248 of comparator 208. Signal 226 is used to control multiplexer RX_Final 210 and determine which of outputs 246 and 248 of comparators 206 and 208, respectively, is sent to the output 212 of RX_Final 210.

In other examples, the I2C port of Device A 202 can instead be coupled to side B 290 and the I2C port of Device B 268 can be coupled to side A 280 of the bidirectional isolated buffer device 200. Transistor 264 and transistor 232 can be either a metal oxide semiconductor field effect transistor (MOSFET) or a bipolar junction transistor (BJT). Furthermore, in some examples, the voltages on the I2C bus can be different on the Device B side than on the Device A side.

For the purposes of this disclosure, if an element is referred to as being "coupled" to another element, it may be directly coupled to the other element, or intervening elements may exist. If an element is referred to as being "directly coupled" to another element, no other intervening elements are intentionally disposed. The terms "substantially the same," "substantially equal," "substantially equal," "approximately equal," and "approximately the same" describe a quantitative relationship between two objects. This quantitative relationship may prefer the two objects to be equal by design but with the anticipation that a certain amount of variations can be introduced by the fabrication process.

While operations are depicted as occurring in a particular order, this should not be understood as requiring that all illustrated operations be performed or that the operations are required to be performed in that order to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. A serial buffer device comprising:
   a first serial input/output (I/O) port;
   a second serial I/O port;
   a first comparator having first and second inputs and an output, wherein the first input is coupled to the first serial I/O port, and the second input is coupled to a first reference voltage source;
   a second comparator having first and second inputs and an output, wherein the first input is coupled to the first serial I/O port, and the second input is coupled to a second reference voltage source;
   a multiplexer having first and second inputs, a control terminal, and an output, wherein the first input is coupled to the output of the first comparator, and the second input is coupled to the output of the second comparator;
   a transistor having a control terminal and first and second current terminals, wherein the control terminal is coupled to the output of the multiplexer and the first current terminal is coupled to the second serial I/O port;
   a third comparator having first and second inputs and an output, wherein the first input is coupled to the second serial I/O port, the second input is coupled to a third reference voltage source, and the output is coupled to the control terminal of the multiplexer; and
   an impedance controlled driver circuit having an input and an output, wherein the input is coupled to the output of the third comparator and the output is coupled to the first serial I/O port.

2. The buffer device of claim 1, including a voltage clamp circuit having an input terminal coupled to the output of the third comparator and an output terminal coupled to the first serial I/O port.

3. The buffer device of claim 1, wherein the transistor is a first transistor, and the impedance controlled driver circuit includes:
   a transmit circuit having first and second inputs and an output, wherein the first input is coupled to the output of the third comparator and the second input is coupled to the first serial I/O port; and
   a second transistor having a control terminal and first and second current terminals, wherein the control terminal is coupled to the output of the transmit circuit and the first current terminal is coupled to the first serial I/O port.

4. The buffer device of claim 1, including:
   a first isolation device having a first terminal coupled to the output of the multiplexer and a second terminal coupled to the control terminal of the transistor; and a second isolation device having a first terminal coupled to the output of the third comparator and a second terminal coupled to the input of the impedance controlled driver circuit;

wherein the first and second isolation devices block DC signals while allowing AC signals to pass.

5. The buffer device of claim 4, wherein the first and second isolation devices include first and second capacitors.

6. The buffer device of claim 4, wherein the first and second isolation devices include a transformer.

7. The buffer device of claim 4, wherein the first and second isolation devices include an optocoupler.

8. The buffer device of claim 1, wherein the voltage of the first reference voltage source is approximately equal to $0.3*V_{CC}$ where $V_{CC}$ is the supply voltage for the first comparator.

9. The buffer device of claim 1, wherein the voltage of the second reference voltage source is approximately equal to 275 mV.

10. The buffer device of claim 1, wherein the voltage of the third reference voltage source is approximately equal to between $0.3*V_{DD}$ and $0.7*V_{DD}$, where $V_{DD}$ is the supply voltage for third comparator.

11. The buffer device of claim 1, wherein the first and second serial I/O ports are configured to couple to first and second devices, respectively, on an I2C bus.

12. A method for reducing latch-ups in serial bus buffers comprising:

receiving, at a first serial input/output (I/O) port, a logic signal from a first device coupled to a serial bus;

comparing, using a first comparator, the logic signal to a first reference voltage and providing a first output;

transmitting the first output to an input of an impedance controlled driver circuit coupled to a second serial I/O port;

driving an output of the impedance controlled driver low responsive to a low at the input of the impedance controlled driver, or allowing the output of the impedance controlled driver to float high responsive to a high at the input of the impedance controlled driver;

driving the voltage at the output of the impedance controlled driver circuit responsive to the first output transitioning from a high to a low, then to a first regulated voltage;

increasing the voltage at the output of the impedance controlled driver circuit to a second regulated voltage;

measuring the voltage at the output of the impedance controlled driver circuit and comparing it to a second reference voltage; and determining, based on the comparison, whether the second serial I/O port is being driven low by a second device coupled to the serial bus.

13. The method of claim 12, wherein determining whether the serial bus is being driven low by a second device includes observing an output of a second comparator having a first input coupled to the output of the impedance controlled driver circuit and a second input coupled to a second reference voltage source.

14. The method of claim 13, including selectively transmitting to the first serial I/O port either the output of the second comparator or an output of a third comparator having a first input coupled to the output of the impedance controlled driver circuit and a second input coupled to a third reference voltage source.

15. The method of claim 12, wherein the transmitting includes sending the signal through an isolation device that blocks DC signals while allowing AC signals to pass.

16. The method of claim 15, wherein the isolation device includes an optocoupler.

17. The method of claim 15, wherein the isolation device includes a transformer.

18. The method of claim 12, wherein the voltage at the output of the impedance controlled driver circuit is limited to a maximum voltage limit.

19. The method of claim 12, wherein increasing the voltage at the output of the impedance controlled driver circuit includes increasing an on-resistance of a transistor in the impedance controlled driver circuit.

20. The method of claim 12, wherein the serial bus is an I2C bus.

* * * * *